Dec. 7, 1965   J. J. SCHOFIELD ET AL   3,221,663
WASH FLOW BEARING SYSTEM
Filed May 20, 1964   2 Sheets-Sheet 1

INVENTORS
JOHN J. SCHOFIELD
FRANCIS P. SCHIERBERL

BY *Am Prentus*
ATTORNEY

INVENTORS
JOHN J. SCHOFIELD
FRANCIS P. SCHIERBERL

BY *Arc Prentiss*
ATTORNEY

United States Patent Office 3,221,663
Patented Dec. 7, 1965

3,221,663
WASH FLOW BEARING SYSTEM
John J. Schofield, Glastonbury, and Francis P. Schierberl, West Hartford, Conn., assignors to Chandler Evans Inc., a corporation of Delaware
Filed May 20, 1964, Ser. No. 368,862
5 Claims. (Cl. 103—126)

This invention pertains to gear type fuel pumps, having fuel pressure-loaded bearings; and more particularly has reference to provision of novel means for preventing pumped fuel, containing solid contaminants, from entering spaces between the gears and their pressure-loaded bearings, during operation of the pump.

In accordance with the requirement of paragraph (b) of the Commissioner's notice for examination under the "New Special Procedure" (812 O.G. 953) applicant hereby agrees that, in the event the request for special status is granted, the above-captioned applicatiton will not include more than ten (10) claims at any time during the prosecution of said application.

Solid contaminants, such as dust and grit, cause wear and abrasion on the abutting surfaces of gears and their bearings, which materially reduce the useful life of the pump; and various schemes for coping with this problem have been proposed.

Heretofore, these schemes have generally sought to prevent solid contaminants in the pumped fuel from entering the pump (as a whole), by means of barrier filters interposed across the fuel streams entering the pump. Such filters not only require special design and add to the weight and size of the pump, but are also susceptable to clogging by the contaminants. Such clogging causes high pressure loses which reduce the operating capacity and efficiency of the pump. If a relief valve is used to bypass the contaminated fuel around a clogged filter, the straining effect of the filter is lost and the original problem is left unsolved.

Still more ungainly than barrier filters, have been attempts to make use of other devices and methods of contaminant separation; as (for example) centrifuges. These devices add not only weight and bulk requirements to the pump, but also include the possibility of mechanical failure.

This invention does not separate the contaminants by means of such large unwieldy devices, but allows the contaminated fuel to flow through the pump, but prevents its entrance into the spaces between the gears and their bearings, as hereinafter described.

In prior art, the control of solid contaminants in gear-type pumps has been based upon systems wherein the fuel is cleaned before entering the working members of the pump. Such pumps had to be protected by external devices, in order to protect the sensitive gears and bearings of the pump. In this invention, protection has been directly applied only to the critical spaces between the gear side faces and the abutting bearing thrust surfaces, where wear by abrasion leads to pump failure. In this invention, protection is built into the pump by a system that is self-adjusting and self-regulating, and the pump's main function of pumping is not burdened with the process of cleaning.

The primary object of this invention is to provide a simpler and more effective means for solving the contamination problem, without incurring large penalties in weight, bulk, reduced volumetric efficiency, increased complexity of design, and loss of fuel flow and efficiency.

More specifically, further objects of this invention are to provide:

(a) A wash flow bearing system, as an integral part of the pump, in the form of an original and novel modification of existing pump parts.

(b) Means which do not require bulky, complex, additional devices, or units whose failure may jeopardize the performance of the pump.

(c) Means which are self-adjusting and self-regulating, depending on the pressure and flow requirements imposed on the pump.

(d) Means which obtains its required fluid from the discharge stream of the pump, or from any other available source of high pressure fluid.

(e) Means which require no filter across the main flow stream of the pump.

(f) Means which causes but a small drop in the efficiency of the pump.

(g) Means which are applicable in any instance where seal or abutting surfaces are involved, and where low leakage may be tolerated in order to protect these surfaces from the effects of abrasive contaminants in any pump or similar type of application.

(h) Means for protecting the seal and/or bearing thrust surfaces from running dry and thus over-heating; and the flow from the system may be used to lubricate and cool rubbing parts; and provide a cushion of fluid between the surfaces to be protected, thus reducing the rate of wear.

With these and other objects in view, which may be incident to my improvements, this invention comprises the combination and arrangement of elements, as described hereinbelow, and illustrated in the accompanying drawings, in which.

Broadly comprehended, this invention allows clean fuel at high pressure to act as a liquid barrier against the entrance of contaminated fuel into the critical spaces between the bearing thrust surfaces and the side surfaces of the gears. The clean fuel is obtained from the discharge passage of the pump, or from some other source under high pressure. Contamination is prevented by a wash-flow filter, and the fuel is supplied at a low rate of flow through small passages to annular grooves in the sealing or thrust surfaces to be protected. The pressure gradient from the pumping chamber to gear journals is reduced and the flow of contaminated fuel is confined to the pumping chamber. By so confining the contaminated fuel, the rate of wear and abrasion upon the critical surfaces is substantially reduced.

Further, the bearing wash flow system of my invention ensures that sufficient clean fuel flow penetrates between each gear journal and its bearing and other parts in close proximity thereto, to provide adequate lubrication and cooling. Finally, the cushion of clean fuel itself protects these rubbing surfaces from abrasion and wear.

Figure 1:
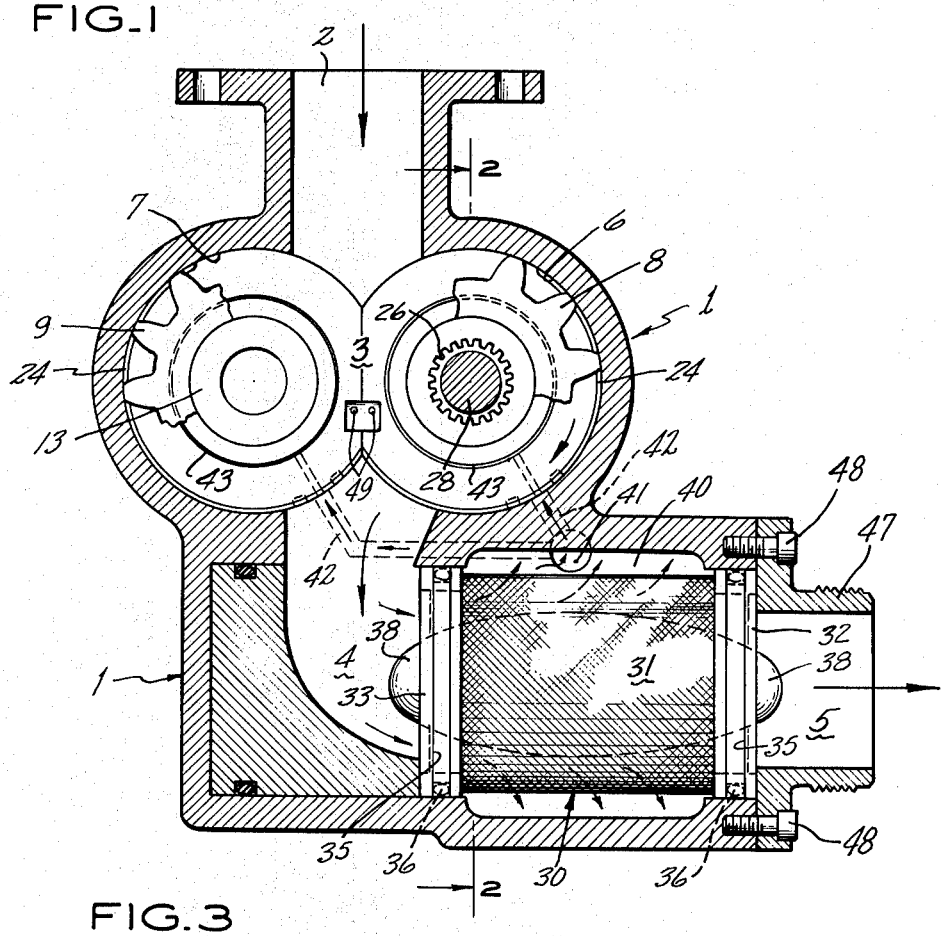
FIGURE 1 shows, a vertical section along the line 1—1 of FIGURE 2, a fuel gear pump embodying my invention.
Figure 3:
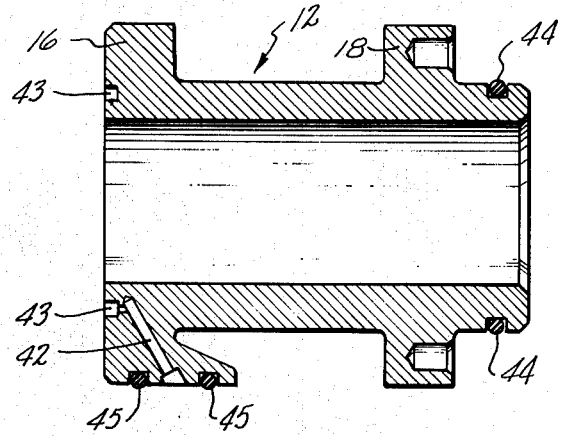
FIGURE 3 is an enlarged, longitudinal sectional view of one of the pressure-loaded bearings, shown in FIGURES 1 and 2.
Figure 2:
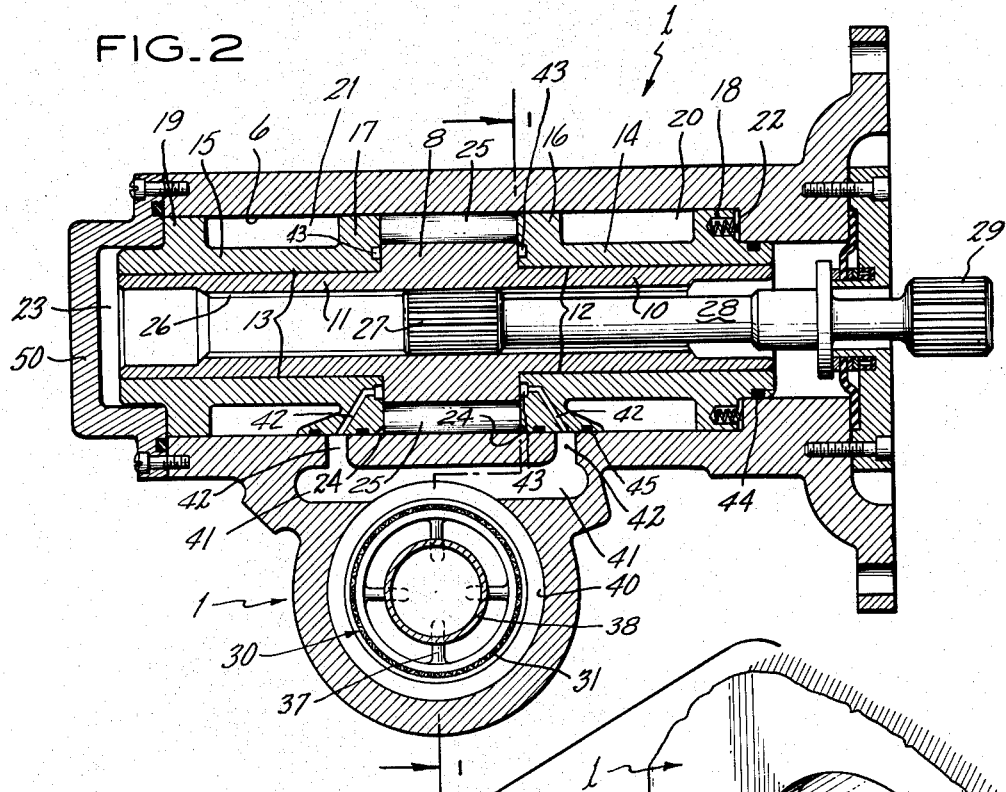
FIGURE 2 is a cross-sectional view taken along the line 2—2 of FIGURE 1 at a somewhat reduced scale.

As shown in FIGURES 1 and 2 of the drawings, the reference numeral 1 denotes the body casing of the complete pump, comprising a fuel inlet passage 2, a pumping chamber 3, a filter chamber 4, and a fuel outlet passage 5. Pumping chamber 3 comprises a pair of cylindrical bores 6 and 7, whose longitudinal axes are at right angles to the section plane of FIGURE 1, and in each of which is rotatably mounted respectively, pumping gear members 8 and 9, whose teeth intermesh along the center line of chamber 3. As shown in FIGURE 2, gear member 8 comprises a pair of integral, tubular portions 10 and 11, which extend in opposite directions and are journaled respectively in axially-movable, sleeve, bushing bearings 12 and 13 in bore 6.

As gear members 8 and 9, and their respective bushing bearings are identical, only gear member 8 and its bearings 12 and 13, will be further described, it being understood that gear member 9 and its bushing bearings are identical with the corresponding elements of gear member 8.

As shown in FIGURE 2, bearing bushings 12 and 13 comprise a tubular portion 14 or 15, and an integral flange portion 16 or 17, respectively. Bearing bushings 12 and 13 each also have a second flange, 18 or 19, which serves to hold its bushing in axial alignment within bore 6. The annular space 20, between flanges 16 and 18, is connected by a drilled passage 49 (shown in FIGURE 1), to that portion of pumping chamber 3 in which the fuel is at discharge pressure so that said pressure is communicated to space 20. A continuation of drilled passage 49 also pierces flange 18 to communicate said pressure to space 22. The pressure is contained in space 22 by means of O-ring 44 which forms a seal between bearing 12 and housing 1.

As shown in FIGURE 2, bearing 13 is similarly arranged in bore 6 of housing 1. Flange 19 of bearing 13, however, rests against the cover 50 to accurately locate bearing 13 in the axial direction. Provision for containing discharge pressure under flange 19 is not necessary.

As shown in FIGURE 2, the space 25, bounded by the outer periphery of gear member 8 and the opposite wall of bore 6, and by flanges 16 and 17, is in open communication with chamber 4 through the chamfers 24 on flanges 16 and 17 except for the portion of the gear adjacent to the unchamfered portion of the bearing flanges (from the end of chamfer 24 to the inlet passage 2). Thus, fuel at pump discharge pressure is applied to the outer peripheries of gear 8 and flanges 16 and 17 over that portion containing chamfer 24. The pump inlet pressure is applied over the remaining portion of the periphery.

By virtue of the above-described arrangement of bearing bushings 12 and 13, pump discharge pressure is applied to the entire back faces of flanges 16 and 18 while a portion of the interface surface between bushings 12 and 13 and the opposite side faces of gear 8 is subjected to pump inlet pressure. This creates a pressure differential force which acts to keep each bearing bushing 12 and 13 in sealing contact with the adjacent side face of gear member 8 at all times during operation of the pump.

As shown in FIGURE 2, gear member 8 is connected by a spline 26 to an externally knurled portion 27 of a drive shaft 28, which in turn is connected to the engine to which fuel is supplied by the pump, by an externally knurled portion 29, so that gear member 8 is the pump driving member, and gear member 9, whose teeth mesh with the teeth of member 8, is the driven member of the pump.

Figure 4:
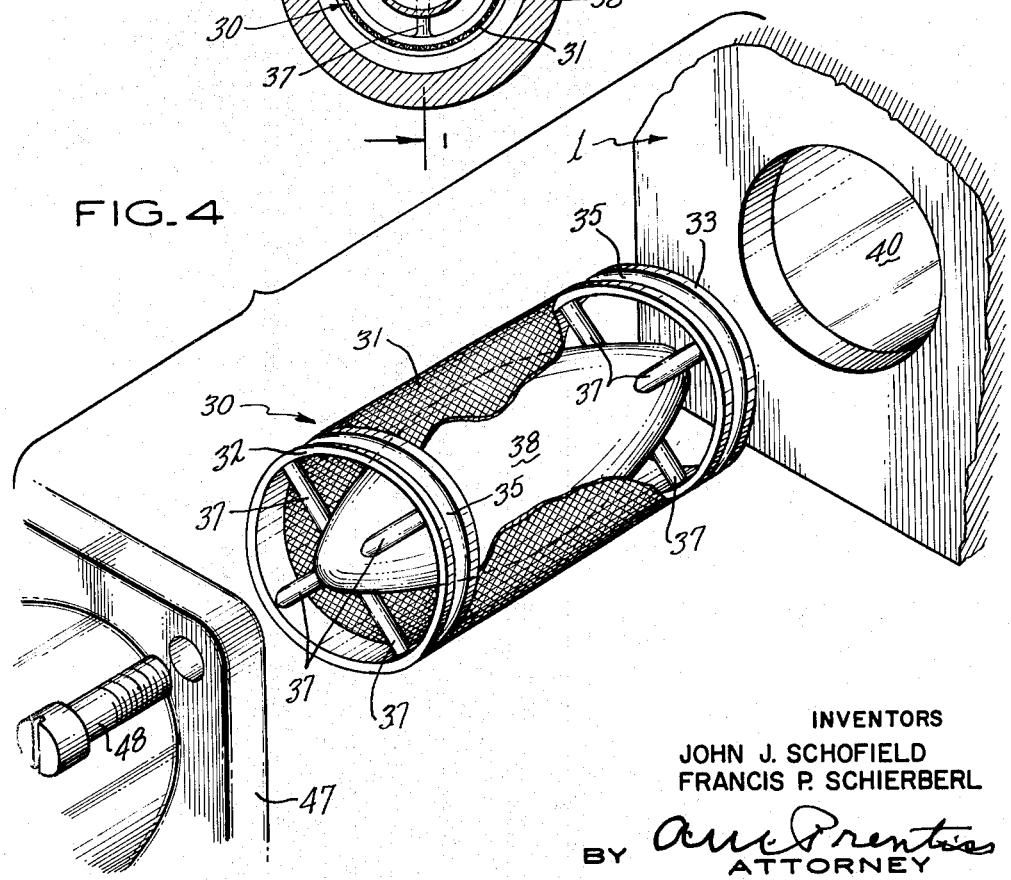
FIGURE 4 is an isometric elevation of the wash-flow filter unit shown in FIGURES 1 and 2, as viewed from the outlet side of the pump.

As shown in FIGURES 1, 2 and 4, I have provided a wash flow filter unit 30, which comprises a tubular piece of woven and sintered wire cloth 31, which is affixed at its opposite ends to a pair of metal retaining rings 32 and 33 (see FIG. 4). Each of rings 32 and 33 has on its outer periphery a groove 35 for holding an O-ring 36, which serves to seal the space between retaining rings 32, 33 and the opposite wall of chamber 4. Attached to each ring 32 and 33 is a spider 37 (see FIG. 4) fixed to one end of a hollow, sheet-metal barrier 38, which serves to deflect the stream of fuel flowing from chamber 4 to outlet 5, through filter unit 30, outwardly towards the filter element 31. Since barrier 38 partially chokes the stream of fuel flowing through filter unit 30, it creates a pressure which forces a minor fraction of said fuel to flow radially outward through the interstice of the filter element 31, where the suspended solid contaminant particles are separated from the fuel flowing through filter element 31. These solid particles are momentarily retained on the inner surface of said element 31, and clean fuel (from which solid contaminants are removed by filter 31) flows through an annular space 40 between filter element 31 and the wall of chamber 4 (see FIG. 1), and thence through connection passages 41 and 42. Passage 42 connects with a circular groove 43 in the interface surface of bearing bushing 12. Leakage from passage 42 into bore 6 is prevented by O-ring 45.

Since the clean fuel in groove 43 is at high (pump discharge) pressure, it is forced to flow radially outward from groove 43, and fill the interface space between flange 16 and the adjacent side face of gear 8, said fuel also flows inwardly to the gear journal, where the pressure is lower (pump inlet pressure). This outward radial flow is between flange 16 and gear 8, augmented by the centrifugal force exerted on the fuel film by the rotation of gear 8.

The clean fuel thus filling the interface space between flange 16 and the side of gear 8, acts as a liquid barrier to prevent the entrance of contaminated fuel into said interface space, and thus serves to prevent abrasion and wear on the interface surfaces by the solid particles in the contaminated fuel entering the pumping chamber 3 through inlet 2.

Since the flow of fuel, through filter element 31 is only a small fraction of the total flow of fuel through the filter unit 30 and pump outlet 5, only a minor fraction of the solid contaminants in the fuel passing through the pump (i.e. through filter unit 30 and outlet 5) are retained on the inner-surface of filter 31, and these retained particles are washed from the inner-surface of filter 31 back into the stream of fuel passing through filter unit 30 and passage 5. Accordingly, there is little or no clogging of the filter element 31 by the accumulation of solid contaminants thereon. In the rare event that the filter element 31 should become clogged by particles of contaminants, the filter unit 30 can be removed from the pump and replaced by a fresh filter unit, by detaching the outlet connection piece 47 from casing 1, by removing the connecting screws 48.

Since the flow of clean fuel through the interface space between flange 16 and the side face of gear 8, exerts a pressure on bearing bushing 12 which tends to reduce the efficiency of the seal between said surfaces, the hydraulic force acting on the back face of flange 16 must be adjusted to compensate for the force of clean fuel acting on the interface. Except for this compensating adjustment, the pressure-loading features of bearing bushing 12 form no part of my invention, and need not be further elaborated.

From the foregoing description of this invention, it is seen that it achieves the objects of the invention, as set forth in cols. 1 and 2, hereinabove, and solves the problem of fuel contamination by eliminating the need of external devices and by modifying certain sensitive integral parts of the gear pump to protect the pump while contaminants are introduced into the pump with the fuel.

Further, the bearing wash flow system of my invention ensures that there is sufficient fuel flow into the bearing journals, or other parts in close proximity, to provide lubrication and cooling. Finally, this invention ensures that the rubbing surfaces operate with a cushion of fluid between them, thus reducing wear.

While we have shown and described the preferred embodiment of our invention, we desire it to be understood that we do not limit ourselves to the particular combination and arrangement of elements disclosed by way of illustration, as these can be altered and changed by those skilled in the art without departing from the spirit of my invention or exceeding the scope of the appended claims.

We claim:

1. In a gear-type fuel pump which comprises a fuel inlet, a pumping chamber, a fuel filter chamber, and a fuel discharge outlet, all connected in flow series: a pair of intermeshing, pumping gears, each journaled in a pair of oppositely disposed fuel pressure-loaded bearings, mounted in said pumping chamber; a wash-flow filter having a tubular filtering element in said filter chamber; means for passing through said filtering element a minor fraction of the fuel flowing through said filter; and means for feeding said fraction of fuel, under substantially pump discharge pressure, to and through the interspaces between the sides of each gear and the adjacent end of each of said bearings, whereby said filtered, clean fuel prevents the entrance of unfiltered, contaminated fuel in said pumping chamber from entering said interspaces.

2. A fuel pump as in claim 1, wherein said filter is also constructed and arranged that the main bulk of the fuel flowng therethrough sweeps over the inner surface of said filtering element and washes away any particles of solid contaminants which are retained on said inner surface, thereby preventing the clogging of said filtering element by solid contaminants.

3. A fuel pump as in claim 2, wherein said filter has axially mounted therein a fuel stream-deflecting barrier which deflects the fuel stream flowing through said filter against the inner surface of said filtering element, thereby increasing the static pressure of the deflected fuel above that of the main fuel stream passing through said filter, so that the pressure of said filtered fuel is substantially the same as the pump discharge pressure.

4. A fuel pump as in claim 1, wherein each of said bearings has on its inner end an outwardly extending annular flange which is coextensive with the adjacent side of each gear member, each of said flanges and the coacting interposed gear member forming an interspace therebetween; and means for introducing filtering fuel at substantially pump discharge pressure, into each of said interspaces at a point near the root of its adjacent gear member, whereby said filtered fuel flows across each of said interspaces, and prevents the entrance of contaminated fuel thereinto.

5. A fuel pump according to claim 3, having means for detachably mounting said filter and barrier, as a unit, in said filter chamber, and detachably attaching said fuel discharge outlet to said filter chamber, whereby said filter unit may be removed and replaced by a fresh filter unit, without dismantling the fuel pump.

References Cited by the Examiner
UNITED STATES PATENTS

| | | | |
|---|---|---|---|
| 1,451,859 | 4/1923 | Balcker | 230—207 |
| 1,795,579 | 3/1931 | Storey | 103—126 |
| 2,243,585 | 5/1941 | Towler et al. | 103—220 |
| 2,276,107 | 3/1942 | Simons | 103—126 |
| 2,400,485 | 5/1946 | Cardillo | 103—126 |
| 2,446,194 | 8/1948 | Samiran | 103—126 |
| 2,676,548 | 4/1954 | Lauck | 103—126 |
| 2,870,720 | 1/1959 | Lorenz | 103—126 |
| 2,885,965 | 5/1959 | Haberland | 103—126 |
| 2,891,483 | 6/1959 | Murray et al. | 103—126 |
| 2,980,028 | 4/1961 | Edwards et al. | 103—126 |
| 2,997,960 | 8/1961 | Kimijima et al. | 103—126 |
| 3,011,448 | 12/1961 | Oliver | 103—126 |

DONLEY J. STOCKING, *Primary Examiner.*

UNITED STATES PATENT OFFICE
CERTIFICATE OF CORRECTION

Patent No. 3,221,663                December 7, 1965

John J. Schofield et al.

It is hereby certified that error appears in the above numbered patent requiring correction and that the said Letters Patent should read as corrected below.

Column 1, line 14, beginning with "In accordance" strike out all to and including "said application." in line 20, same column 1; column 5, line 11, for "also" read -- so --.

Signed and sealed this 20th day of September 1966.

(SEAL)
Attest:

ERNEST W. SWIDER                             EDWARD J. BRENNER
Attesting Officer                                 Commissioner of Patents